United States Patent [19]
Robles et al.

[11] Patent Number: 5,758,107
[45] Date of Patent: May 26, 1998

[54] SYSTEM FOR OFFLOADING EXTERNAL BUS BY COUPLING PERIPHERAL DEVICE TO DATA PROCESSOR THROUGH INTERFACE LOGIC THAT EMULATE THE CHARACTERISTICS OF THE EXTERNAL BUS

[75] Inventors: Roman L. Robles, Austin; Phil K. Brewer, Jr., Buda, both of Tex.

[73] Assignee: Motorola Inc., Schaumburg, Ill.

[21] Appl. No.: 194,895

[22] Filed: Feb. 14, 1994

[51] Int. Cl.$^6$ .................................................. G06F 13/28
[52] U.S. Cl. ........................ 395/307; 395/880; 395/882
[58] Field of Search ............................... 395/825, 853, 395/878, 880, 882, 892, 280, 281, 306, 307, 308, 309, 311, 473, 800, 494

[56] References Cited

U.S. PATENT DOCUMENTS

| | | | |
|---|---|---|---|
| 4,366,540 | 12/1982 | Berglund et al. | 395/556 |
| 4,631,659 | 12/1986 | Hayn, II et al. | 395/494 |
| 4,633,437 | 12/1986 | Mothersole et al. | 395/250 |
| 4,683,534 | 7/1987 | Tietjen et al. | 395/307 |
| 5,034,917 | 7/1991 | Bland et al. | 711/167 |
| 5,113,518 | 5/1992 | Durst, Jr. et al. | 395/186 |
| 5,245,703 | 9/1993 | Hubert | 395/285 |
| 5,297,231 | 3/1994 | Miller | 395/2.1 |
| 5,301,306 | 4/1994 | Plog | 395/556 |
| 5,313,108 | 5/1994 | Lee et al. | 327/161 |
| 5,363,492 | 11/1994 | King et al. | 395/306 |
| 5,386,517 | 1/1995 | Sheth et al. | 395/880 |
| 5,386,518 | 1/1995 | Reagle et al. | 395/310 |
| 5,410,656 | 4/1995 | King et al. | 395/306 |
| 5,457,785 | 10/1995 | Kikinis et al. | 395/308 |
| 5,463,756 | 10/1995 | Saito et al. | 395/494 |
| 5,471,587 | 11/1995 | Fernando | 395/309 |
| 5,499,384 | 3/1996 | Lentz et al. | 395/821 |
| 5,557,757 | 9/1996 | Gephardt et al. | 395/306 |

OTHER PUBLICATIONS

Paul Polansky; "Token-bus-controller interface must resolve family disparities;" EDN Mar. 17, 1988; pp. 167-178 (1988).

Primary Examiner—Moustafa M. Meky
Attorney, Agent, or Firm—Paul J. Polansky

[57] ABSTRACT

A data processing system (30) such as a personal computer expansion board includes a peripheral device (33) designed to interface to a system bus (21). The peripheral device (33) need not be connected directly to the system bus (21). Instead, a data processor (32) connects to the system bus through one interface circuit (37). This interface circuit (37) adapts different timing characteristics of the data processor's signals to those of the system bus (21). The data processor (32) then accesses the peripheral device (33) through a second interface circuit (34), which adapts the timing characteristics of the data processor's signals to those of the peripheral device (33). Thus, the peripheral device (33), which may have a large existing base of software programs, may be programmed locally, without loading the system bus (21). In one embodiment, an access controller (38) extends an access cycle following an access to the peripheral device (33), to prevent contention of data seen by the data processor (32) during a subsequent access.

17 Claims, 5 Drawing Sheets

SYSTEM FOR OFFLOADING EXTERNAL BUS BY COUPLING PERIPHERAL DEVICE TO DATA PROCESSOR THROUGH INTERFACE LOGIC THAT EMULATE THE CHARACTERISTICS OF THE EXTERNAL BUS

FIELD OF THE INVENTION

This invention relates generally to data processing systems, and more particularly, to data processing system interfaces.

BACKGROUND OF THE INVENTION

For manufactured goods, there is always a need to minimize product costs. In data processing systems, the need to minimize costs includes such considerations as component count, programming complexity, development costs, and the like. In the case of personal computer (PC) expansion boards, the need to minimize costs centers around minimization of chip count and simplicity of programming.

Personal computers generally have a central processing unit (CPU) board, and a system (backplane) bus to connect expansion or option boards such as video driver boards, modems, network interfaces, and the like. These boards must interface to the CPU board via the system bus, and typically, the PC manufacturer specifies the signals and their required timing to interface to the system bus. These bus specifications allow other manufacturers to build expansion boards which can interoperate with the CPU board. The bus specifications include things such as address and data bus size, control signal definitions, and control signal timing. The bus specification usually parallels the chip specification for the microprocessor on the CPU card. Because of this, many integrated circuits may be available to perform the peripheral functions which inherently interoperate with the CPU board because they have the same control signal definitions and timing specifications as the microprocessor on the CPU board.

It is generally known how to interconnect integrated circuits of one type (such as microprocessors) to integrated circuits (such as peripherals) of other types. For example, Paul J. Polansky in "Token-bus-controller interface must resolve family disparities,"*EDN*, Mar. 17, 1988, pp. 167–178, teaches how to connect a peripheral microprocessor manufactured by Motorola, Inc. to a CPU available from Intel Corp., where each has timing specifications of its respective microprocessor family. In order to facilitate this interface, extra interconnection or "glue" logic is required. However, the general requirement to minimize manufacturing costs would still indicate that such interconnection should be avoided where possible. As the number of available integrated circuits increases over time, the requirement for these interfaces will decrease, while the need for cost reduction remains.

SUMMARY OF THE INVENTION

Accordingly, the present invention provides, in one form, a data processing system with a flexible data interface, comprising a data processor, an external interface circuit, a peripheral device, and an internal interface circuit. The data processor has a first plurality of input and output signals having first timing and interface characteristics which are coupled to an internal bus. The external interface circuit is coupled to the data processor, and adapts the first plurality of input and output signals to a second plurality of input and output signals conducted on an external bus. The second plurality of input and output signals have second timing and interface characteristics. The peripheral device has a third plurality of input and output signals which are adapted to couple to the external bus, and which have the second interface and timing characteristics. The internal interface circuit is coupled to the data processor and to the peripheral device, and adapts the first plurality of input and output signals to the third plurality of input and output signals. Thus, the peripheral may be operated without loading the external bus by being coupled to the data processor through the internal interface circuit.

These and other features and advantages will be more clearly understood from the following detailed description taken in conjunction with the accompanying drawings.

BRIEF DESCRIPTION OF THE DRAWINGS

FIG. 5 illustrates a timing diagram of peripheral interface signals illustrating a problem of the prior art.

DETAILED DESCRIPTION OF A PREFERRED EMBODIMENT

Figure 1:
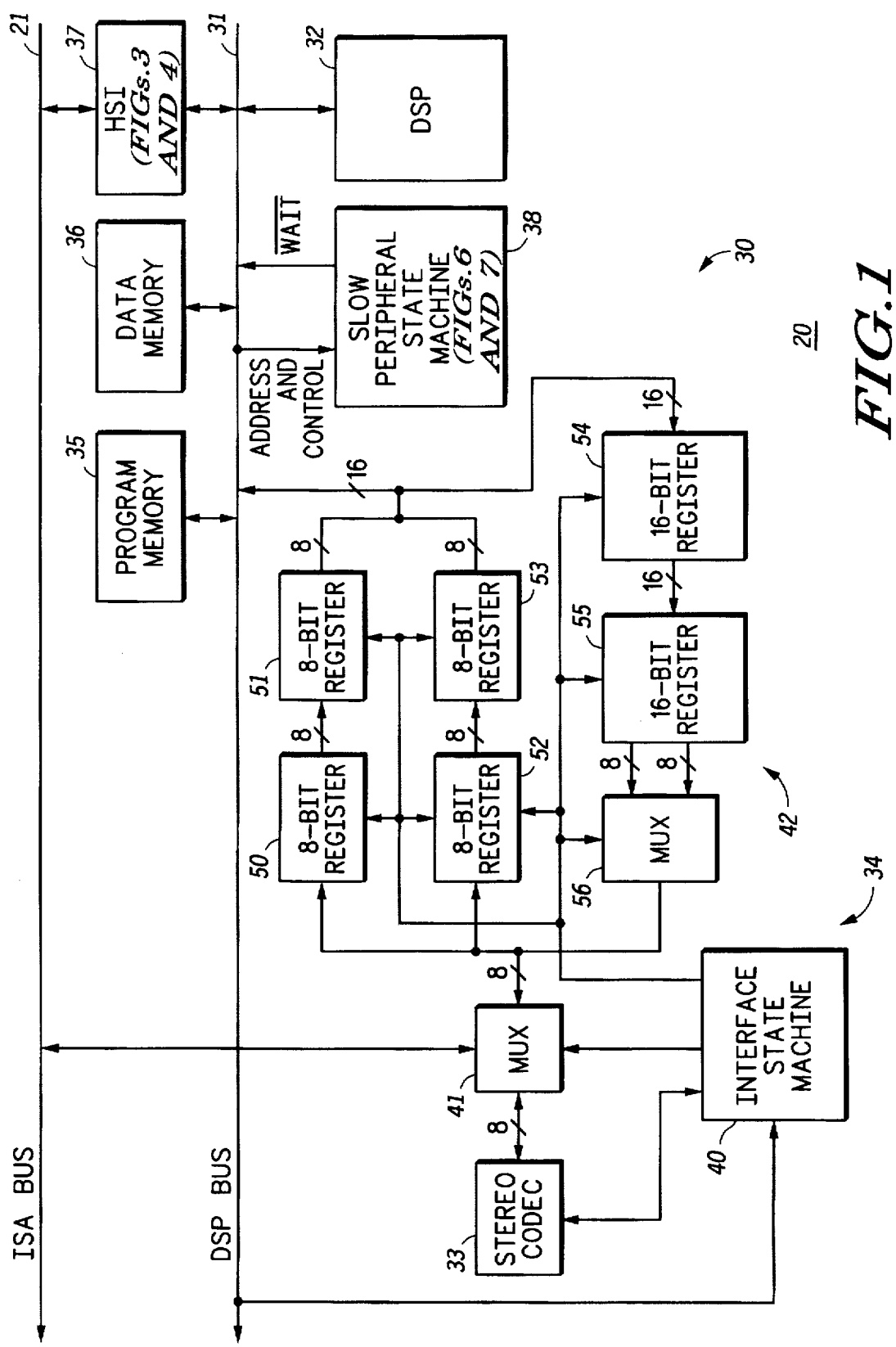
FIG. 1 illustrates in block diagram form a computer system including a data processing system according to the present invention.

FIG. 1 illustrates in block diagram form a computer system 20 including a data processing system 30 according to the present invention. Computer system 20 is a personal computer (PC) system whose functional components are computer boards which are connected together via an industry standard architecture (ISA) system bus 21 labelled "ISA BUS". One such computer board is data processing system 30, which includes a local or board-level bus 31 labelled "DSP BUS", a digital signal processor (DSP) 32, a stereo coder-decoder (codec) 33, an internal interface circuit 34, a program memory 35, a data memory 36, a high-speed external interface 37 to ISA BUS 21 labelled "HSI", and a slow peripheral state machine 38. ISA BUS 21 is a bus defined by the signal timing and interface characteristics listed in TABLE I below:

TABLE I

| Signal Name | Size | Description |
|---|---|---|
| DATA | 16 | General purpose data path |
| ADDRESS | 16 | Address information |
| IOCHRDY | 1 | Holds off bus cycle |
| IOW | 1 | Write signal for I/O operation |
| IOR | 1 | Read signal for I/O operation |
| DACK1 | 1 | DMA #1 acknowledge signal |
| DREQ1 | 1 | DMA #1 request signal |
| SYSCLK | 1 | System clock |
| IOCS16 | 1 | I/O operation using 16-bit data |
| IRQ4 | 1 | Interrupt Request #4 |
| IRQ5 | 1 | Interrupt Request #5 |

TABLE I-continued

| Signal Name | Size | Description |
| --- | --- | --- |
| IRQ6 | 1 | Interrupt Request #6 |
| IRQ7 | 1 | Interrupt Request #7 |
| IRQ10 | 1 | Interrupt Request #10 |
| IRQ11 | 1 | Interrupt Request #11 |
| AEN | 1 | Address enable signal | where signals which are active low are indicated with an overbar, and are otherwise active high. As used here, "active low" means that the signal is in its true or active state at a logic low voltage, and "active high" means that the signal is in its true or active state at a logic high voltage.

DSP 32 functions as the central processing unit (CPU) of system 30, but can be accessed or provide data to a PC CPU board (not shown) connected to ISA bus 21. Accesses to and from system 30 may occur through HSI 37. DSP BUS 31 conducts address, control, and data signals as defined by the timing specifications of DSP 32. DSP 32, program memory 35, data memory 36, HSI 37, and slow peripheral state machine 38 are all connected to at least portions of DSP BUS 31.

In the illustrated embodiment, DSP 32 is 56002 DSP available from Motorola, Inc., but it should be apparent that other DSPs or data processors may be used as well. DSP 32 executes a sequence of instructions defining its program, which are generally stored in program memory 35. DSP 32 also uses a data memory 36 as a general purpose memory storage area. DSP 32 has a virtual Harvard architecture, in which program and memory spaces are distinct, but accessed through the same physical bus (DSP BUS 31). Pertinent signals of DSP 32 conducted on DSP BUS 31 are summarized in TABLE II below:

TABLE II

| Signal Name | Size | Description |
| --- | --- | --- |
| DATA | 24 | General purpose data path |
| ADDRESS | 16 | Address information |
| WAIT | 1 | Holds off bus cycle |
| BR | 1 | Bus request input |
| BG | 1 | Bus grant output |

Stereo codec 33 receives stereo data from a physical medium such as a compact disc (CD), microphones, or the like, and converts the data to digital form to provide to DSP 32. DSP 32 then processes the stereo data digitally using such techniques as finite impulse response (FIR) filtering, infinite impulse response (IIR) filtering, fast Fourier transforms (FFTs), and the like. Stereo codec 33 also receives processed data from DSP 32 to convert back to analog form and to provide to speakers, cassette tape, or the like. In the illustrated embodiment, stereo codec 33 is the CS4231 available from Crystal Semiconductor, but stereo codec 33 may also be any other suitable stereo codec such as the AD1848 available from Analog Devices. Stereo codec 33 has a set of signals whose timing and interface characteristics conform to those of ISA BUS 21 with the exception that it uses an 8-bit data path. The timing and interface characteristics of stereo codec is illustrates in TABLE III below:

TABLE III

| Signal Name | Size | Description |
| --- | --- | --- |
| DATA | 8 | General purpose data path |
| ADDRESS | 2 | Address information |
| PDRQ | 1 | DMA Playback data request |
| PDAK | 1 | DMA Playback acknowledge |
| CDRQ | 1 | DMA Capture data request |
| CDAK | 1 | DMA Capture data acknowledge |
| CS | 1 | Chip select |
| CRD | 1 | Read select signal |
| CWR | 1 | Write select signal |
| RESET | 1 | Reset chip |

In general, DSP 32 has a set of signals whose timing and interface characteristics are different from those of either ISA BUS 21 or stereo codec 33. Thus, system 30 includes interface 34 to adapt signals from stereo codec 33 to DSP BUS 31, and vice versa. Interface 34 includes generally an interface state machine 40, a multiplexer 41 labelled "MUX", and a data interface circuit 42. Interface state machine 40 is connected to DSP BUS 31 and receives information from DSP BUS 31 to control the operation of the various components to which it is connected. One such component is stereo codec 33, and interface state machine 40 has a bidirectional connection for conducting several control signals to and from stereo codec 33. Interface state machine 40 also has outputs connected to MUX 41 and to data interface circuit 42 for controlling their operation as well.

MUX 41 is a bidirectional multiplexer and has a first bidirectional port connected to data interface circuit 42, a second bidirectional port connected to ISA BUS 21, and a third bidirectional port connected to stereo codec 33, and a control input connected to the second output of interface state machine 40 for selecting connections between the three ports thereof. MUX 41 provides a programmable connection between stereo codec 33 and a selected one of either ISA BUS 21 or DSP BUS 31, through data interface circuit 42, as selected by the control signals provided by interface state machine 40.

Data interface circuit 42 includes four 8-bit registers 50–53, two 16-bit registers 54 and 55, and a MUX 56. Register 50 has an 8-bit input terminal connected to the first bidirectional port of MUX 41, an 8-bit output terminal, and a control input terminal connected to interface state machine 40. Register 51 has an 8-bit input terminal connected to the output terminal of register 50, an 8-bit output terminal connected to a first 8-bit portion of DSP BUS 31, and a control input terminal connected to interface state machine 40. Register 52 has an 8-bit input terminal connected to the first bidirectional port of MUX 41, an 8-bit output terminal, and a control input terminal connected to interface state machine 40. Register 53 has an 8-bit input terminal connected to the output terminal of register 52, an 8-bit output terminal connected to a second 8-bit portion of DSP BUS 31, and a control input terminal connected to interface state machine 40.

Register 54 has an input terminal connected to a third 16-bit portion of DSP BUS 31, a control input connected to interface state machine 40, and an output terminal. Register 55 has an input terminal connected to the output terminal of register 54, a control input connected to interface state machine 40, and an output terminal. The output terminal of register 55 is a 16-bit output terminal which is illustrated in two 8-bit portions which are provided to the first and second inputs of MUX 56, respectively. MUX 56 also has a control input connected to interface state machine 40, and an output terminal connected to the first bidirectional port of MUX 41.

Typically, system 30 is used to enhance the functionality of system 20 with such features as high-speed data communication, high quality audio playback, audio editing, music authoring, telephone answering services, speakerphone capabilities, sound effects (commonly used to enhance computer-based games), text-to-speech conversion, voice recognition, etc. These are tasks which require numerically intensive computations and often interface with analog components (microphones, the telephone line, audio systems, etc.). System 30 may be called upon to provide one or more of these functions concurrently.

Stereo codec 33 performs two functions: it converts two analog channels (stereo) of information into highly accurate digital representations of the signals it receives (e.g., microphone inputs or the telephone line), and it converts digital streams of information into two channels (stereo) of analog information which can be provided to headphones, audio amplifiers, or a telephone line. Because a large base of pre-existing software has been written which uses existing codecs, it is advantageous to use these existing devices to offer the user the ability to run this existing software.

When stereo codec 33 has a pair of samples (left channel and right channel) ready, it activates signal CDRQ. Similarly, when stereo codec 33 is ready to accept another pair of stereo samples, it activates signal PDRQ. Stereo codec 33 assumes that the target processor will have a DMA controller to move these samples (in the form of four sequential byte-wide transfers). The transfers are acknowledged via signals $\overline{\text{CDAK}}$ and $\overline{\text{PDAK}}$, respectively, and without regard to the state of signal $\overline{\text{CS}}$.

Status and control information is also transferred over the data bus of stereo codec 33 as single, byte-wide, entities. The target processor distinguishes these transfers from the stereo sample transfers by activating signal $\overline{\text{CS}}$. Obviously, since stereo codec 33 has only one 8-bit wide bus, and thus only one type of transfer (control write, status read, data read, data write) may occur at any one time, even though more than one type of transfer may be requested/pending.

Internal interface circuit 34 responds to the DMA requests from stereo codec 33 and the status/control requests from the target processor (DSP 32), prioritizes the requests, sequences the bytes through holding registers 50–55, provides the handshaking required by the DMA request circuit of stereo codec 33, and generates interrupts to inform the target processor of the need to effect register replenishment and/or sample retrieval. Internal interface circuit 34 emulates the behavior of the ISA bus, activating signals $\overline{\text{CDAK}}$ and/or $\overline{\text{PDAK}}$ in response to the DMA requests generated by stereo codec 33 activating signals PDRQ and CDRQ, respectively.

Figure 2:
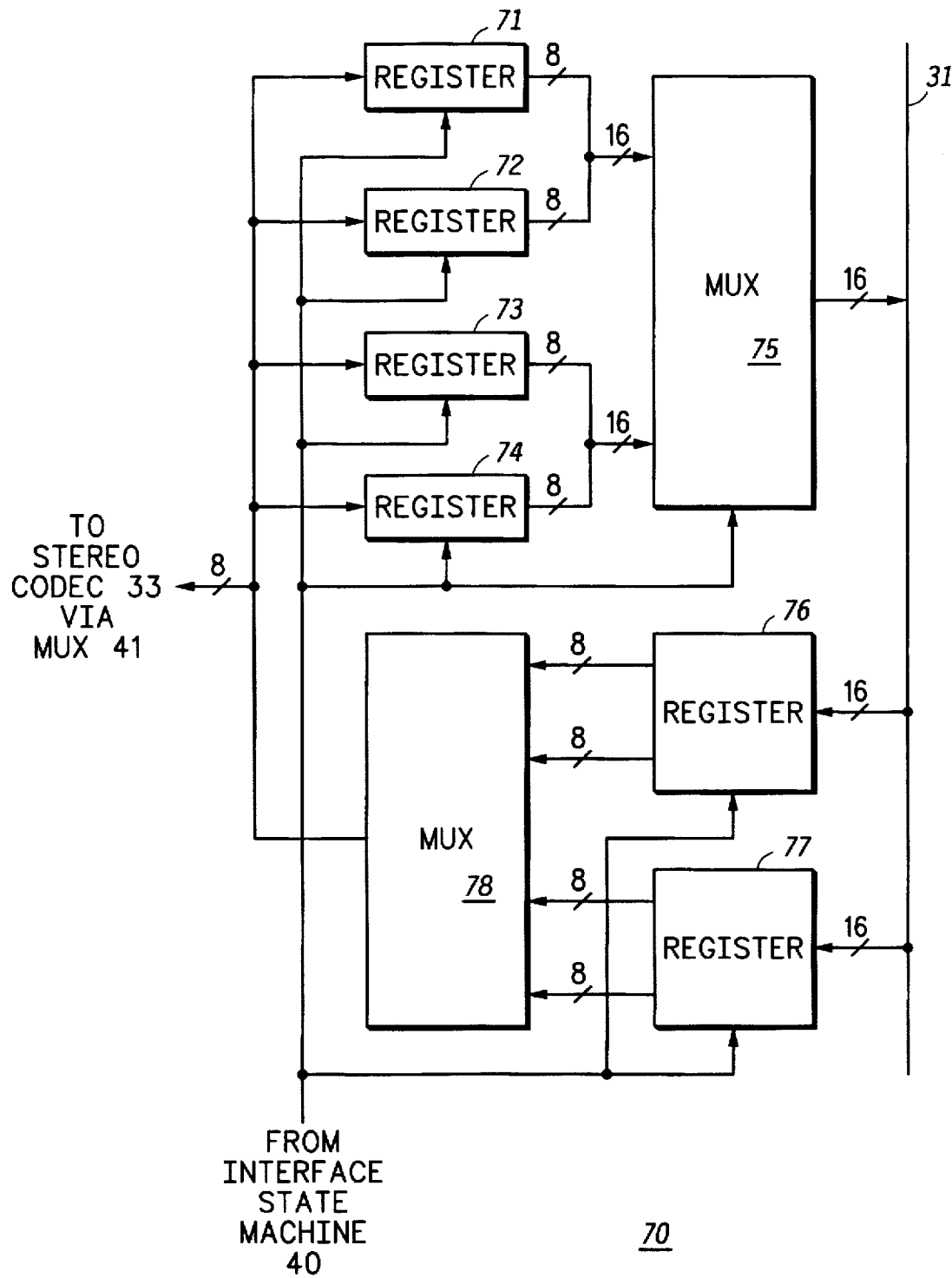
FIG. 2 illustrates in block diagram form a second embodiment of the data interface circuit of FIG. 1.

FIG. 2 illustrates in block diagram form a second embodiment 70 of the data interface circuit of FIG. 1. Data interface circuit 70 includes four 8-bit registers 71–74, a 2-to-1 MUX 75, two 16-bit registers 76 and 77, and a 4-to-1 MUX 78. Each of registers 71–74 has an input terminal connected to the first bidirectional port of MUX 41 of FIG. 1, a control input terminal connected to interface state machine 40, and an output terminal. The 8-bit outputs of each of registers 71 and 72 are concatenated to form a 16-bit input to a first input terminal of MUX 75. The 8-bit outputs of each of registers 73 and 74 are concatenated to form a 16-bit input to a second input terminal of MUX 75. MUX 75 also has a control input terminal connected to interface state machine 40, and an output terminal for providing a 16-bit output to DSP BUS 31.

Register 76 has a 16-bit input terminal connected to DSP BUS 31, a control input terminal connected to interface state machine 40, and an output terminal divided into two 8-bit outputs provided to first and second input terminals of MUX 78. Register 77 has a 16-bit input terminal connected to DSP BUS 31, a control input terminal connected to interface state machine 40, and an output terminal divided into two 8-bit outputs provided to third and fourth input terminals of MUX 78. MUX 78 also has a control input terminal connected to interface state machine 40, and an output terminal connected to the first bidirectional port of MUX 41.

Data interface circuit 70 replaces the FIFO-styled data registering of data interface circuit 42, with an alternate approach which places the individual samples in uniquely addressed sets of latches. This approach may require additional routing resources in implementations based on Programmable Logic Devices (PLDs), but offers the benefits of unambiguous channel identity. Data interface circuit 42 delivered the samples to/from register sets which were co-located at a single address. Left/Right channel status could be indicated in numerous fashions, including the state of an unused data bit location on systems with buses exceeding sixteen bits in size, or through the use of status bits. The software could utilize simple looping structures to read/write the data address twice, perhaps taking advantage of architectural features inherent to the specific target processor. In the alternate embodiment using data interface circuit 70, the use of specific left and right-channel addresses circumvents the need for resolving ambiguity at the expense of extra address decoding logic and (in some implementations) additional PLD routing requirements. In some software approaches, this approach simplifies the input/output routines employed.

Figure 3:
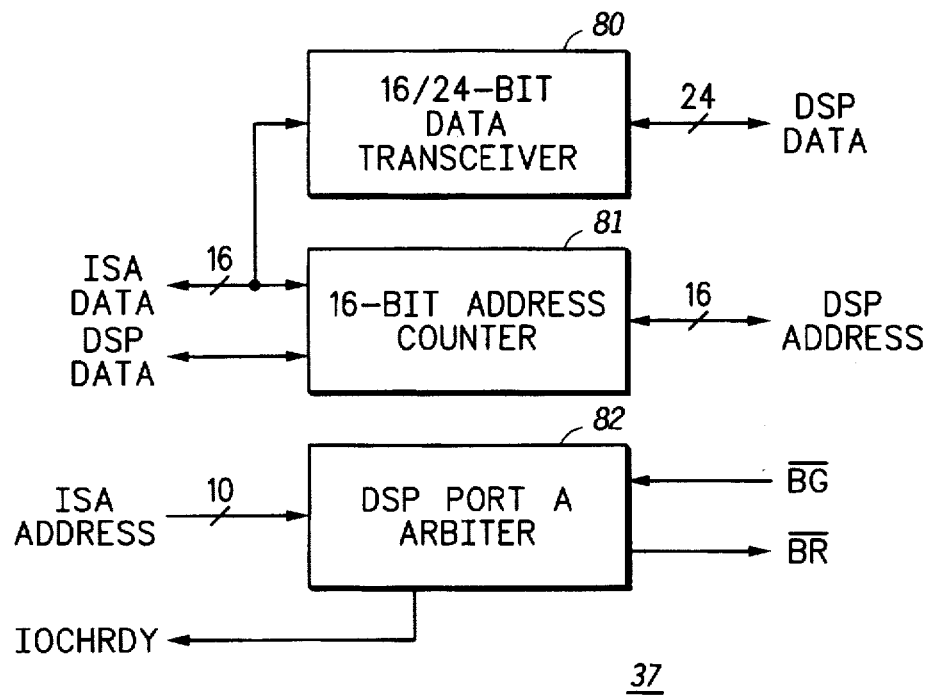
FIG. 3 illustrates in block diagram form the high-speed interface (HSI) of FIG. 1.

FIG. 3 illustrates in block diagram form HSI 37 of FIG. 1. HSI 37 includes a 16/24 bit data transceiver 80, a 16-bit address counter 81, and a DSP port "A" arbiter 82. Transceiver 80, which includes a 16-bit transceiver for sixteen higher-order data bits and an 8-bit latch for eight lower-order data bits, has a first bidirectional terminal connected to ISA BUS 21 of FIG. 1 for conducting the 16-bit data of ISA BUS 21 labelled "ISA DATA", and a second bidirectional terminal connected to DSP BUS 31 for conducting the 24-bit data of DSP BUS 31 labelled "DSP DATA". Address counter 81 has a first bidirectional terminal connected to ISA BUS 21 for conducting the 16-bit ISA DATA, a second 24-bit input connected to DSP BUS 31 for conducting the 24-bit DSP DATA, and a third bidirectional connection to DSP BUS 31 for conducting the 16-bit address of DSP BUS 31 labelled "DSP ADDRESS". Arbiter 82 has an input terminal connected to ISA BUS 21 for receiving a least-significant ten bits of the address conducted on ISA BUS 21 labelled "ISA ADDRESS", a second input port for receiving signal $\overline{\text{BG}}$ from DSP BUS 31, an output terminal for providing signal IOCHRDY to ISA BUS 21, and an output terminal for providing signal $\overline{\text{BR}}$ to DSP BUS 31.

High Speed Interface (HSI) 37 is a bidirectional port used to transfer data between ISA BUS 21 and the DSP BUS 31. In addition, HSI 37 permits the transfer of 24-bit programs and data across 16-bit ISA BUS 21. On the DSP 32 side of the interface, HSI 37 operates in a direct memory access (DMA) fashion by stealing cycles of DSP BUS 31 bandwidth and transferring the contents of sequentially addressed memory locations between DSP BUS 31 and the host processor's bus, ISA BUS 21. As seen by the host processor, these transfers appear at one uniquely addressed I/O register (two registers when extended precision data is desired). This feature circumvents the need for the host processor software to resort to DMA techniques over ISA BUS 21. This is an advantage since the DMA mechanism of ISA BUS 21 is often slower than repeated I/O moves on advanced ISA BUS host processors. Additionally, use of DMA techniques on the ISA BUS is often complicated significantly when the host software utilizes virtualized memory, as in the case of applications software which is based on the "WINDOWS" operating system available from Microsoft Corporation and similar advanced operating systems. HSI 37 permits the user to maximize ISA BUS 21 transfer rates, minimizes host software complexity by avoiding the use of DMA on ISA BUS 21, and still takes full advantage of any transfer mechanisms available on the DSP BUS 31.

Before any transfer is effected, address counter 81 of HSI 37 must be initialized. Some embodiments will load this register from ISA BUS 21 and other embodiments will load address counter 81 from DSP BUS 31. It is possible to inhibit the automatic increment of address counter 81 by setting a control bit.

In one embodiment, signal $\overline{BR}$ is activated by external logic when the host processor on ISA BUS 21 needs to effect a transfer to/from the ISA BUS. DSP 32 responds to the activation of its $\overline{BR}$ input by completing the current cycle on DSP BUS 31, relinquishing mastership of this bus, and asserting signal $\overline{BG}$ to indicate to arbiter 82 that the bus is available. Data transceiver 80 drives the bus appropriately for the transfer direction selected by generating the appropriate transfer strobe signals (i.e., signal $\overline{WR}$ or signal $\overline{RD}$), and the data movement is completed. Since ISA BUS 21 is (at most) sixteen bits wide, data transceiver 80 includes an additional latch to capture/write the lower eight bits required by 24-bit program transfers and extended precision data sets. For transfers from DSP BUS 31 to ISA BUS 21, the host processor of ISA BUS 21 reads a single, unique address in its input/output (I/O) address space, causing arbiter 82 to initiate a DSP 32 cycle steal as described above. The host processor retrieves the upper sixteen bits of data during this transfer and the bits of lower significance are stored in a latch in transceiver 80 residing at a different ISA I/O address. For cases in which the host processor requires extended precision data or program words, this latch can be read any time after the transfer (and before the next transfer). Conversely, if the host processor desires a transfer of extended precision data to DSP BUS 31, then this extended precision latch 80 must be loaded before the transfer of the upper sixteen bits, since it is this transfer (the upper 16-bit portion) which initiates the cycle steal operation on the DSP BUS 31. At the end of each cycle steal operation of DSP 32, address counter 81 is incremented if an inhibit bit is not set. An alternate implementation of this invention could utilize latches in place of the transceivers in transceiver 80 in order to minimize the amount of time in which DSP BUS 31 is under mastership of HSI 37.

Figure 4:
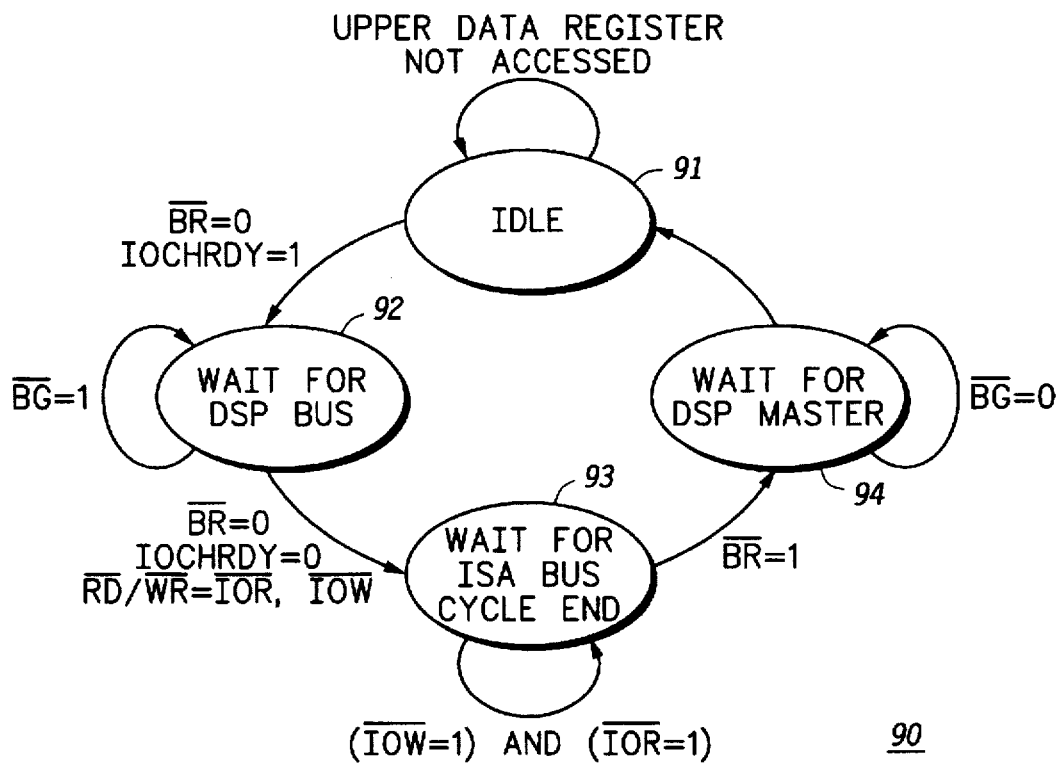
FIG. 4 illustrates a state flow diagram of the high speed interface of FIG. 1.

FIG. 4 illustrates a state flow diagram 90 of HSI 37 of FIG. 1. Appendix A lists PLD equations to implement state flow diagram 90, which are compatible with the hardware description language available from Altera Corporation. Arbiter 82 of FIG. 3 is usually in an idle state 91, waiting for the host processor to initiate a transfer by accessing the uniquely addressed I/O register which is associated with the sixteen most significant bits of the impending transfer. When the arbiter 82 recognizes an access to the upper data register (either a read or write access), HSI 37 requests mastership of DSP BUS 31 by activating bus request signal $\overline{BR}$. The ISA BUS cycle is held via activation of signal IOCHRD Y, and HSI 37 enters a "WAIT FOR DSP BUS" state 92, where it remains until DSP 32 responds to the activation of signal $\overline{BR}$ by yielding mastership of DSP BUS 31 and activating bus grant signal $\overline{BG}$.

Arbiter 82 acknowledges mastership of the bus by deactivating signal IOCHRD Y, thus permitting the ISA bus cycle to complete. The data transfer strobes of DSP 32 ($\overline{RD}/\overline{WR}$) are driven as appropriate for the type of transfer initiated by the host processor (i.e., a read or a write of DSP data). Arbiter 82 progresses to a "WAIT FOR ISA BUS CYCLE END" state 93 where it remains until the ISA BUS 21 cycle completes, as indicated by both ISA BUS 21 strobes ($\overline{IOR}, \overline{IOW}$) being in their inactive states. Once the ISA BUS 21 cycle has finished, arbiter 82 deactivates signal $\overline{BR}$ and progresses to a "WAIT FOR DSP MASTER" state 94 where it loops until DSP 32 re-asserts mastership of DSP BUS 31 by deactivating signal $\overline{BG}$. At this point, another cycle could begin, so arbiter 82 returns to IDLE state 91.

FIG. 5 illustrates a timing diagram of peripheral interface signals illustrating a problem of the prior art. The buses of commercially-available DSPs are designed to maximize the speed of data transfer between the DSP and fast static random access memory (RAM). To achieve this speed maximization, these DSPs assume that devices connected to these buses will be capable of driving and releasing the bus in the most expeditious manner technically possible. These designs minimize the time between the removal of data at the end of a bus cycle and the presentation of new data on any subsequent cycle. Often, the amount of time permitted for this change of data exceeds the ability of slower peripheral devices to remove their data from the bus. This problem is exacerbated by the address decode delays common to this class of peripheral device. When the peripheral device cannot remove its data from the bus in a timely fashion, the data of the subsequent cycle is corrupted through a "wired-or" contention which results from multiple devices driving the bus concurrently.

FIG. 5 illustrates such a contention problem. DSP 32 initiates the first two transfers during time periods designated "n" and "n+1" by providing addresses labelled "$A_n$," and "$A_{n+1}$". For read cycles, a device such as data memory 36 responds by placing a data element labelled "$D_n$" and "$D_{n+1}$" on the data portion of DSP BUS 31. For write cycles, DSP 32 may place data elements $D_n$ and $D_{n+1}$ on the data portion of DSP BUS 31. Devices such as data memory 36 respond quickly enough to complete the bus cycles.

However, a problem may occur during an access to a slow peripheral such as stereo codec 33 of FIG. 1. During an access to the slow peripheral, at a time period designated "n+2", the slow peripheral is accessed by an address labelled "$A_{n+2}$(SLOW)". Subsequently, the slow peripheral places its data, labelled "$D_{n+2}$", on the data portion of DSP BUS 31. However, the slow peripheral is unable to release its data before DSP 32 begins a subsequent access cycle by placing an address labelled "$A_{n+3}$" on the address portion of DSP BUS 31, and the accessed device places its data on the data portion of DSP BUS 31 as well. The result is that, during a time period labelled "PERIOD OF CONTENTION" and indicated by cross-hatching, data on the data portion of DSP BUS 31 is in an indeterminate state. Thus, DSP 32 may read an incorrect result during time period n+2.

Current solutions to this problem generally involve the use of costly high speed logic buffers and/or the requirement of high speed peripheral devices. In many cases, the associated address decode delays preclude the use of even these approaches. Thus, a new approach is needed.

Figure 6:
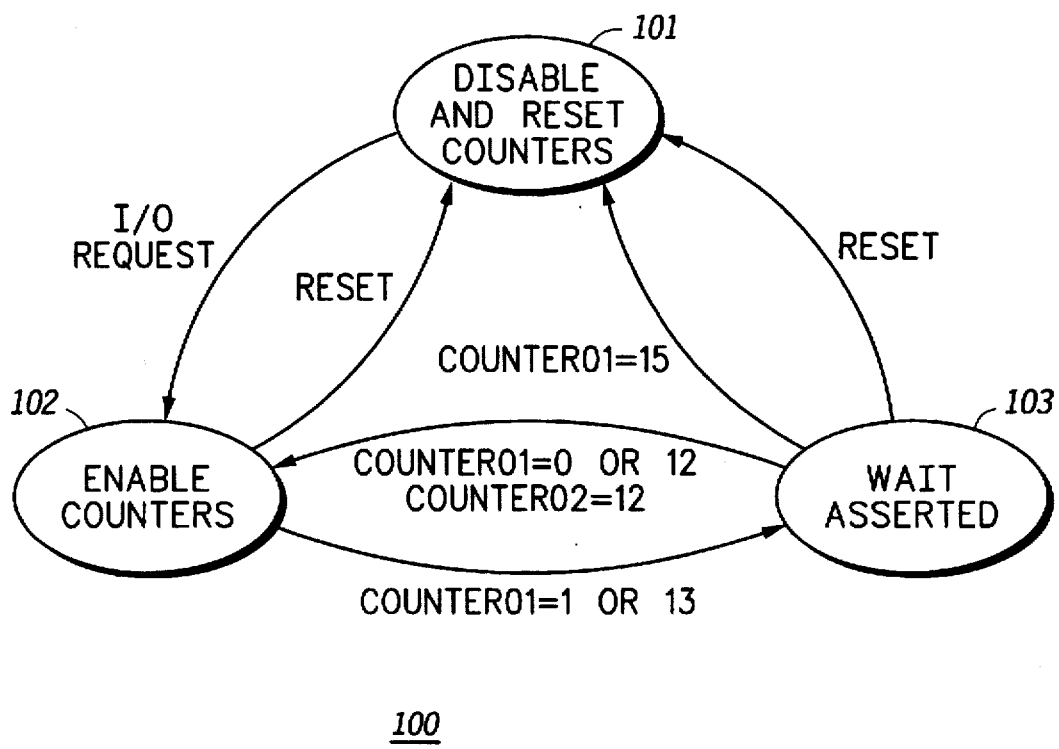
FIG. 6 illustrates a state flow diagram of the slow peripheral state machine of FIG. 1.

FIG. 6 illustrates a state flow diagram 100 of slow peripheral state machine 38 of FIG. 1. Appendix B lists PLD equations to implement state flow diagram 100 for the hardware description language available from Altera Corporation. By the use of state machine 38, data processing system 30 is able to use stereo codec 33 with DSP 32 without the loss of data due to contention. State machine 38 lengthens the bus cycle following accesses to the slower devices (such as stereo codec 33) to permit the slower device to remove its data from DSP BUS 31 before DSP 32 samples the data during the next cycle. State machine 38 waits in an idle state 101 labelled "DISABLE AND RESET COUNTERS", with signal $\overline{\text{WAIT}}$ deactivated and its two internal phase counters (designated "COUNTERΦ1" and "COUNTERΦ2") disabled and reset to zero, waiting for an access to a slow peripheral such as stereo codec 33 to occur. When state machine 38 detects a slow peripheral access by address comparison, and signal $\overline{\text{RESET}}$ is inactive, state machine 38 enters an "ENABLE COUNTERS" state 102. While in ENABLE COUNTERS state 102, COUNTERΦ1 and COUNTERΦ2 count with a clock synchronized to the instruction clock of DSP 32. When COUNTERΦ1 reaches a count value of one, state machine 38 transitions to "WAIT ASSERTED" state 103. While in WAIT ASSERTED state 103, state machine activates signal $\overline{\text{WAIT}}$, and COUNTERΦ1 and COUNTERΦ2 continue to count. When COUNTERΦ1 equals twelve, state machine 38 deactivates signal $\overline{\text{WAIT}}$ and enters ENABLE COUNTERS state 102. This entry causes the current DSP access to start its termination sequence and signals the slow peripheral device to start removing its data from DSP BUS 31. When COUNTERΦ1 reaches a count value of thirteen and the value of COUNTERΦ2 is not equal to twelve, state machine 38 enters WAIT ASSERTED state 103 and COUNTERΦ1 and COUNTERΦ2 continue to count. This entry starts the cycle lengthening process for the next DSP access. While in WAIT ASSERTED state 103, state machine 38 activates signal $\overline{\text{WAIT}}$ and COUNTERΦ1 and COUNTERΦ2 continue to count. When either COUNTERΦ1 equals fifteen or signal $\overline{\text{RESET}}$ becomes active, state machine 38 enters DISABLE AND RESET COUNTERS state 101 and deactivates signal $\overline{\text{WAIT}}$. At this point, the slow peripheral device has removed its data from the DSP BUS 31, the next device's data is on DSP BUS 31, and DSP 32 is starting its next access cycle. This brings state machine 38 back to its idle state waiting for the next slow peripheral access to occur.

Figure 7:
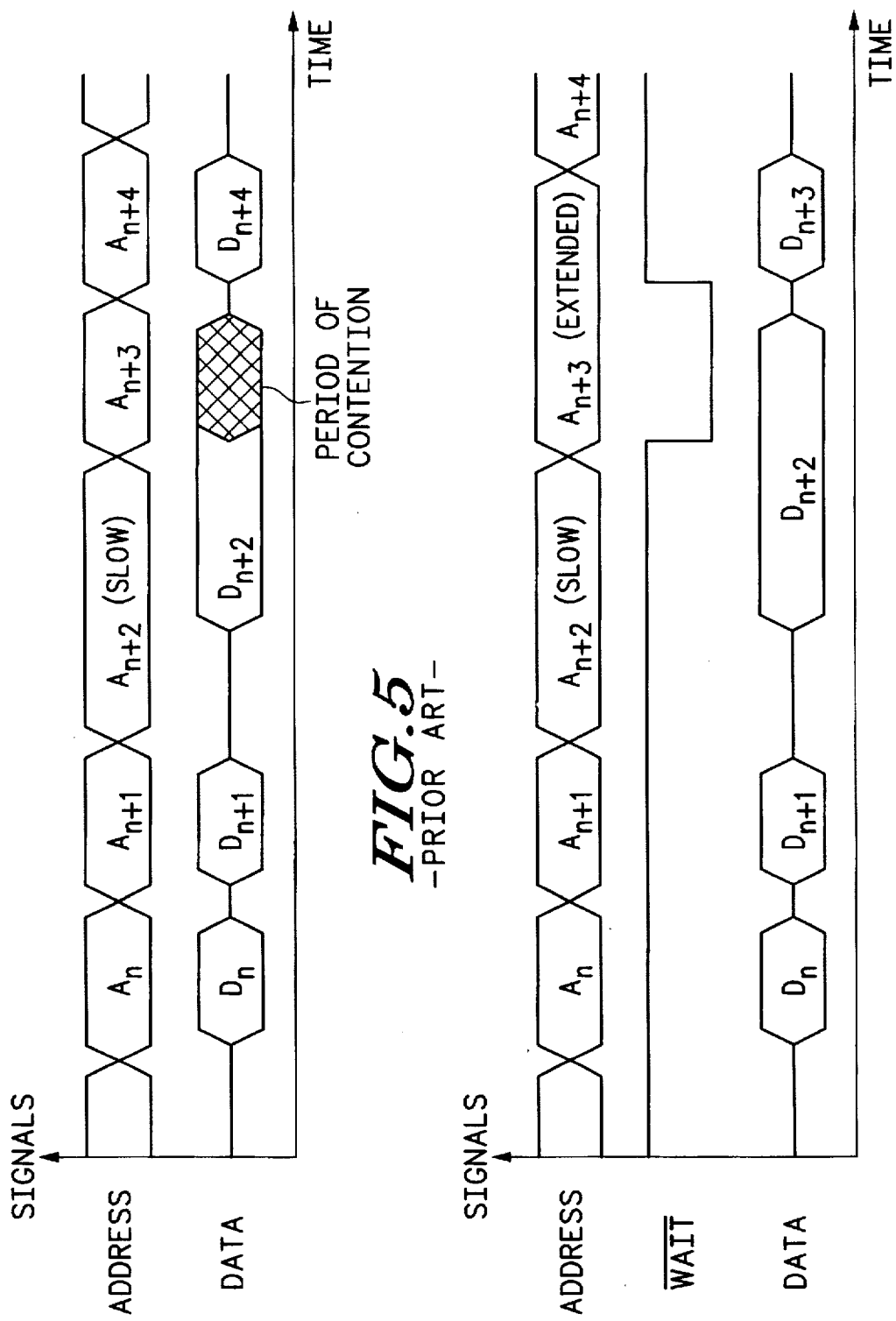
FIG. 7 illustrates a timing diagram of the data processing system of FIG. 1.

FIG. 7 illustrates a timing diagram of data processing system 30 of FIG. 1. After detecting an access to a slow peripheral (such as stereo codec 33 through interface circuit 34) during time period n+2, state machine 38 extends the following bus cycle during time period n+3 in order to permit the slower device to remove its data from the DSP BUS 31. Thus, before DSP 32 samples the data during time period n+3, the slow peripheral has already removed its data from the bus. This succeeding cycle, such as an access to program memory 35 or data memory 36, is lengthened by state machine 38 activating signal $\overline{\text{WAIT}}$ and providing it to DSP 32 during this subsequent cycle. The use of signal $\overline{\text{WAIT}}$ in this fashion differs from known transfer acknowledge signalling, because the lengthening occurs without regard to the type of device addressed so that accesses, as required for instruction fetches, to fast static RAM are permitted immediately following accesses to slow devices.

While the invention has been described in the context of a preferred embodiment, it will be apparent to those skilled in the art that the present invention may be modified in numerous ways and may assume many embodiments other than that specifically set out and described above. For example, state machines 37, 38, and 40 may be implemented using application-specific integrated circuits (ASICs), PLDs, discrete logic, or combinations thereof. In addition, other codecs could be used and different processors besides DSP 32 may be used. Accordingly, it is intended by the appended claims to cover all modifications of the invention which fall within the true spirit and scope of the invention.

APPENDIX A

```
FUNCTION HSI_ADR    (LO_CLK, HI_CLK, CNT_EN, LOAD_LOn, LOAD_HIn,
                    RD_CNTR_LO, RD_CNTR_HI, Y_OE, RD_EXT, EXT[7..0])
                    RETURNS (Y[15..0], D[7..0]);
%
FUNCTION ISA_RDY    (ATTN, IORn, IOWn, SysCLK, RESETn)
                    RETURNS (IOCHRDY, NIOCHRDY);
%
FUNCTION TRI8       (A[7..0], OE)
                    RETURNS (AY[7..0]);
(
    IORn, IOWn, SysCLK, DS_CLK                      : INPUT;
    ISAA[3..0], ATTN                                : INPUT;
    BGn, HREQ                                       : INPUT;
    BRn, IRQ, HACK, HI_Ben, HSI_Ben, HRw, HEn       : OUTPUT;
    DSP_IOn, RESETn, WTn                            : OUTPUT;
    ISAD[7..0], DAB[15..0], DDB[7..0]               : BIDIR;
    IOCS16n, IRQ1, RDn, WRn                         : BIDIR;
    IOCHRDY, DACK, DREQ                             : OUTPUT;
)
VARIABLE
    RESETn                                          : DFFE;
    HRw, HI_Ben, HSI_CNT_EN, IRQ, WT_ENABLE         : DFF;
    HSI_LOBY_WR[7..0], HSI_LOBY_RD[7..0]            : DFF;
    WRLCLn, NIOCHRDY                                : NODE;
    DABOE, DDBOE, BRn                               : NODE;
    HSI_LO_PTR, HSI_HI_PTR, CTRL_WORD               : NODE;
    HSI_DATA_LO, HSI_DATA_WD, RD_HSI_LO             : NODE;
    LD_LOn, LD_HIn, HSI_LO_CLK, HSI_HI_CLK          : NODE;
    RD_CNTR_LO, RD_CNTR_HI                          : NODE;
BEGIN
    CTRL_WORD       = !ATTN & (ISAA[] == X"8");
    HSI_LO_PTR      = !ATTN & (ISAA[] == X"9");
    HSI_HI_PTR      = !ATTN & (ISAA[] == X"A");
    HSI_DATA_LO     = !ATTN & (ISAA[] == X"B");
```

APPENDIX A

```
        HSL_DATA_WD        = !ATTN & (ISAA[] = X"C");
        WRLCLn             = !(!IOWn & !NIOCHRDY);
%*********************************************************%
        RESETn.CLK         = IOWn;
        RESETn.ENA         = CTRL_WORD;
        RESETn.D           = !ISAD[7];
%*********************************************************%
%***                        H S I                      ***%
%***          DEFINE THE HIGH SPEED INTERFACE          ***%
%***                        H S I                      ***%
%*********************************************************%
        HSL_Ben            = !(!BRn & !BGn);
        RDn                = TRI(IORn, !BGn);         % HSI BUS ENABLE USED TO PLACE XCVR ON DDB %
        WRn                = TRI(WRLCLn, !BGn);       % HSI CKT MUST DRIVE WRn/RDn DURING DMA
                                                        CYCLES %
        BRn                = !(RESETn & HSL_DATA_WD & (!IORn # !WRLCLn));   % BUS REQUEST ASSERTS
                                                        DURING XFER OF UPPER 16-BITS %
        IOCS16n            = TRI(GND, HSL_DATA_WD);   % LOW SIGNIFIES CURRENT ISA CYCLE IS
                                                        WORD-WIDE%
        HSL_LO_CLK         = !(!IOWn & HSL_LO_PTR) & BGn;
        HSL_HI_CLK         = !(!IOWn & HSL_HI_PTR) & BGn;
        LD_LOn             = !HSL_LO_PTR;
        LD_HIn             = !HSL_HI_PTR;
        HSL_CNT_EN.CLK     = !(CTRL_WORD & !IOWn);    % HIGH = increment enabled %
        HSL_CNT_EN.D       = ISAD5;
        DABOE              = !BGn & !BRn;             % HIGH enables counters onto
                                                        DAB[15..0]%
        RD_CNTR_HI         = !IORn & HSL_HI_PTR;      % LOW enables LO_PTR onto
                                                        ISAD[7..0]%
        RD_CNTR_LO         = !IORn & HSL_LO_PTR;      % LOW enables HI_PTR onto
                                                        ISAD[7..0]%
%----------------------------------------------------------%
%---            HSI COUNTER - defined in a function    ---%
%----------------------------------------------------------%
        (DAB[15..0], ISAD[7..0])= HSL_ADR (HSL_LO_CLK, HSL_HI_CLK, HSL_CNT_EN,
                             LD_LOn,    LD_HIn,
                             RD_CNTR_LO RD_CNTR_HI DABOE,
                             RD_HSL_LO, HSL_LOBY_RD[7..0]);
        DSP_IOn =!((!RDn # !WRn) & DAB[]= B"111111111XXXXXXX"),  % DSP is accessing I/O space
        IRQ1               = TRI(!HREQ, VCC);         % DSP requests interrupt svc. %
        HACK               = VCC;                     % MUST BE HIGH FOR HI TO FUNCTION %
        RD_HSL_LO          = HSL_DATA_LO & !IORn;
        HSL_LOBY_RD[].D    = DDB[7..0];
        HSL_LOBY_RD[].CLK  = !(!BGn & !RDn);
        HSL_LOBY_WR[].D    = ISAD[];
        HSLhd —LOBY_WR[].CLK = !(HSL_DATA_LO & !WRLCLn);
        DDBOE              = (!WRn & !BGn);
        DDB[7..0]          = TRI8(HSL_LOBY_WR[], DDBOE);
        DREQ               = TRI(VCC, GND);
        DACK               = TRI(VCC, GND);
```

APPENDIX B

```
        FUNCTION ISA_RDY       (ATTN, IORn, IOWn, SysCLK, RESETn)
                               RETURNS (ICCHRDY, NIOCHRDY);
        IORn, IOWn, SysCLK, DSWCLK              : INPUT;
        ISAA[3..0], ATTN                        : INPUT;
        BGn, HREQ                               : INPUT;
        BRn, IIRQ, HACK, HLBen, HSLBen, HRw, HEn : OUTPUT;
        DSP_IOn, RESETn, WTn                    : OUTPUT;
        ISAD[7..0], DAB[15..0], DDB[7..0]       : BIDIR;
        IOCS16n, IRQ1, RDn, WRn                 : BIDIR;
        IOCHRDY, DACK, DREQ                     : OUTPUT;
VARIABLE
        RESETn                                  : DFFE;
        HRw, HLBen, HSL_CNT_EN, IIRQ, WT_ENABLE : DFF;
        HSL_LOBY_WR[7..0], HSL_LOBY_RD[7..0]    : DFF;
        WRLCLn, NIOCHRDY                        : NODE;
        DABOE, DDBOE, BRn                       : NODE;
        HSL_LO_PTR, HSL_HI_PTR, CTRL_WORD       : NODE;
        HSL_DATA_LO, HSL_DATA_WD, RD_HSL_LO     : NODE;
        LD_LOn, LD_HIn, HSL_LO_CLK, HSL_HI_CLK  : NODE;
        RD_CNTR_LO, RD_CNTR_HI                  : NODE;
        WT_CNT[3..0], WT_CNTA[3..0]             : DFFE;
```

-continued

APPENDIX B

```
BEGIN
        CTRL_WORD =    !ATTN & (ISAA[] == X"8");
        WRLCLn =       !(!IOWn & !NIOCHRDY);
%*********************************************%
        RESETn.CLK       =IOWn;
        RESETn.ENA       =CTRL_WORD;
        RESETn.D         =!ISAD[7];
%----------------------------------------------------------------------------%
        WTn INSERTS ADD_ADDITIONAL DELAY AFTER I/O CYCLES ---%
%----------------------------------------------------------------------------%
        WT_ENABLE.D              =VCQ
        WT_ENABLE.CLK            =!DSP_IOn & !(RESETn & HSL_DATA_.WD & (!IORn # !WRLCLn));
        WT_ENABLE.CLRN           =!((WT_CNT[]== X"F") #!RESETn);
        WT_CNT[].CLK             =DSP_CLK;
        WT_CNT[].D               =WT_CNT[].Q +1;
        WT_CNT[].ENA             =WT_ENABLE
        WT_CNT[].CLRN            =!((WT_CNT[]== X"F") #!RESETn);
        WT_CNTA[].CLK            =!DSP_CLK;
        WT_CNTA[].D              =WT_CNTA[].Q + 1;
        WT_CNTA[].ENA            =WT_ENABLE;
        WT_CNTA[].CLRN           =!((WT_CNT[] == X"F") · !RESETn);
        WTn                      =WLCNT[] == X"00" # WT_CNT[]==X"C" # WT_CNTA[] == X"C";
```

We claim:

1. A data processing system with a flexible interface which is adapted to be coupled to an external bus, said external bus having a data portion of a first predetermined size and a control portion having first interface and timing characteristics, comprising:

an internal bus having a data portion of a second predetermined size and a control portion having second interface and timing characteristics different from said first interface and timing characteristics;

a data processor having a data path of said second predetermined size coupled to said data portion of said internal bus, and a control port coupled to said control portion of said internal bus;

a peripheral device having a data path of a third predetermined size and an interface for conducting at least one control signal and adapted to couple to said external bus;

first interface logic having a first data input/output port coupled to said data path of said peripheral device, and a second data input/output port coupled to said data portion of said internal bus, said first interface logic providing control signals to said interface of said peripheral device to emulate said first interface and timing characteristics; and second interface logic having a first data input/output port coupled to said data portion of said external bus, and a second data input/output port for being coupled to said data portion of said internal bus, said second interface logic adapting signals between said internal bus and said external bus;

whereby the data processing system efficiently offloads said external bus by coupling said peripheral device to said data processor through said first interface logic.

2. The data processing system of claim 1 wherein said first predetermined size is equal to eight bits.

3. The data processing system of claim 1 wherein said second predetermined size is equal to at least sixteen bits.

4. The data processing system of claim 1 wherein said external bus is characterized as being a personal computer system bus.

5. The data processing system of claim 1 wherein said data processor is characterized as being a digital signal processor.

6. The data processing system of claim 1 wherein said peripheral device is a stereo coder-decoder (codec).

7. The data processing system of claim 1 wherein said first interface logic comprises:

a data bus interface circuit having a first terminal coupled to said data path of said peripheral device, a second terminal coupled to said data portion of said internal bus, and a control input; and a state machine having a first input coupled to said control portion of said internal bus for receiving at least one control signal therefrom, a first output for providing said at least one control signal to said peripheral device according to said first interface and timing characteristics, and a second output coupled to said control input of said data bus interface circuit.

8. The data processing system of claim 7 wherein said data bus interface circuit comprises:

a first register having an input terminal coupled to said data path of said peripheral device, an output terminal, and a control input coupled to said state machine;

a second register having an input terminal coupled to said output terminal of said first register, an output terminal coupled to a first section of said data portion of said internal bus, and a control input coupled to said state machine;

a third register having an input terminal coupled to said data path of said peripheral device, an output terminal, and a control input coupled to said state machine; and a fourth register having an input terminal coupled to said output terminal of said third register, an output terminal coupled to a second section of said data portion of said internal bus, and a control input coupled to said state machine.

9. The data processing system of claim 7 wherein said data bus interface circuit comprises:

a multiplexer having first and second input terminals, a control input terminal coupled to said state machine, and an output terminal coupled to a first section of a data portion of said internal bus;

a first register having an input terminal coupled to said data path of said peripheral device, a control input terminal coupled to said state machine, and an output terminal coupled to said first input terminal of said multiplexer and forming a first portion thereof;

a second register having an input terminal coupled to said data path of said peripheral device, a control input terminal coupled to said state machine, and an output terminal coupled to said first input terminal of said multiplexer and forming a second portion thereof;

a third register having an input terminal coupled to said data path of said peripheral device, a control input terminal coupled to said state machine, and an output terminal coupled to said second input terminal of said multiplexer and forming a first portion thereof; and a fourth register having an input terminal coupled to said data path of said peripheral device, a control input terminal coupled to said state machine, and an output terminal coupled to said first input terminal of said multiplexer and forming a second portion thereof.

10. A data processing system with a flexible data interface, comprising:

a data processor having a first plurality of input and output signals having first interface and timing characteristics coupled to an internal bus;

an external interface circuit coupled to said data processor for adapting said first plurality of input and output signals to a second plurality of input and output signals conducted on an external bus, said second plurality of input and output signals having second interface and timing characteristics;

a peripheral device having a third plurality of input and output signals adapted to couple to said external bus and having said second interface and timing characteristics; and an internal interface circuit coupled to said data processor and to said peripheral device for adapting said first plurality of input and output signals to said third plurality of input and output signals;

whereby the data processing system efficiently offloads said external bus by coupling said peripheral device to said data processor through said internal interface circuit.

11. The data processing system of claim 10 wherein said external bus is characterized as being a personal computer system bus.

12. The data processing system of claim 10 wherein said data processor is characterized as being a digital signal processor.

13. The data processing system of claim 10 wherein said peripheral device is characterized as being a stereo coder-decoder (codec).

14. The data processing system of claim 10 wherein said first plurality of input and output signals comprises a first bidirectional data bus of a first predetermined size, wherein said second plurality of input and output signals comprises a second bidirectional data bus of a second predetermined size, and wherein said third plurality of input and output signals comprises a third bidirectional data bus of said second predetermined size.

15. The data processing system of claim 14 wherein said internal interface circuit comprises:

a data bus interface circuit having a first terminal coupled to said third bidirectional data bus, a second terminal coupled to said first bidirectional data bus, and a control input; and a state machine having inputs coupled to said data processor and to said peripheral device, a first output for providing at least one control signal to operate said peripheral device according to said second interface and timing characteristics, and a second output coupled to said control input of said data bus interface circuit.

16. The data processing system of claim 15 wherein said data bus interface circuit comprises:

a first register having an input terminal coupled to a data path of said peripheral device, an output terminal, and a control input coupled to said state machine;

a second register having an input terminal coupled to said output terminal of said first register, an output terminal coupled to a first section of a data portion of said internal bus, and a control input coupled to said state machine;

a third register having an input terminal coupled to said data path of said peripheral device, an output terminal, and a control input coupled to said state machine; and a fourth register having an input terminal coupled to said output terminal of said third register, an output terminal coupled to a second section of said data portion of said internal bus, and a control input coupled to said state machine.

17. The data processing system of claim 15 wherein said data bus interface circuit comprises:

a multiplexer having first and second input terminals, a control input terminal coupled to said state machine, and an output terminal coupled to a first section of a data portion of said internal bus;

a first register having an input terminal coupled to a data path of said peripheral device, a control input terminal coupled to said state machine, and an output terminal coupled to said first input terminal of said multiplexer and forming a first portion thereof;

a second register having an input terminal coupled to said data path of said peripheral device, a control input terminal coupled to said state machine, and an output terminal coupled to said first input terminal of said multiplexer and forming a second portion thereof;

a third register having an input terminal coupled to said data path of said peripheral device, a control input terminal coupled to said state machine, and an output terminal coupled to said second input terminal of said multiplexer and forming a first portion thereof; and a fourth register having an input terminal coupled to said data path of said peripheral device, a control input terminal coupled to said state machine, and an output terminal coupled to said first input terminal of said multiplexer and forming a second portion thereof.

* * * * *